United States Patent
Mutreja (10) Patent No.: US 7,039,050 B1
(45) Date of Patent: May 2, 2006

(54) INTRA-PROCESS MESSAGE SWITCH

(75) Inventor: Girish K. Mutreja, Sunnyvale, CA (US)

(73) Assignee: Tibco Software Inc., Palo Alto, CA (US)

( * ) Notice: Subject to any disclaimer, the term of this patent is extended or adjusted under 35 U.S.C. 154(b) by 1047 days.

(21) Appl. No.: 09/784,988

(22) Filed: Feb. 15, 2001

Related U.S. Application Data (60) Provisional application No. 60/182,862, filed on Feb. 16, 2000.

(51) Int. Cl.
*H04L 12/28* (2006.01)
*H04L 12/56* (2006.01)

(52) U.S. Cl. ............... 370/389; 370/390; 370/466; 370/426; 370/432

(58) Field of Classification Search ............... 370/398, 370/299, 400, 401, 466, 467, 218, 303, 307, 370/357, 356, 422, 432, 469, 471, 473, 479, 370/535, 407, 425, 463, 389, 390, 426, 465
See application file for complete search history.

(56) References Cited

U.S. PATENT DOCUMENTS

| | | | | |
|---|---|---|---|---|
| 4,704,717 A | * | 11/1987 | King, Jr. | 370/400 |
| 5,459,717 A | * | 10/1995 | Mullan et al. | 370/351 |
| 5,557,798 A | | 9/1996 | Skeen et al. | |
| 5,809,012 A | * | 9/1998 | Takase et al. | 370/229 |
| 6,038,601 A | | 3/2000 | Lambert et al. | |
| 6,125,399 A | * | 9/2000 | Hamilton | 709/245 |

* cited by examiner

*Primary Examiner*—Ajit Patel
(74) *Attorney, Agent, or Firm*—Baker & McKenzie LLP (57) ABSTRACT

A system, method, and apparatus are provided to enable semi-intelligent switching-based communication between diverse message source types, the addition of new message source types to the switching framework with minimal start-up costs, and local content-based message switching to minimize traffic on the network. A switch and interface are provided that abstracts out the commonalities of interfacing with diverse message sources, provides the mechanics of switching messages between such sources and offers flexibility in the process of deciding the intended recipients.

10 Claims, 10 Drawing Sheets

| | SWITCH INITIALIZATION AND CONTROL |
|---|---|
| 1 | CREATE NEW SWITCH |
| 2 | GET NAME OF A SWITCH |
| 3 | FIND A SWITCH |
| 4 | OBTAIN NUMBER OF SWITCHES |
| 5 | TRAVERSE LIST OF SWITCH |
| 6 | DESTROY A SWITCH |
| 7 | START A SWITCH |
| 8 | STOP A SWITCH |
| 9 | SORT CONTENT INSPECTOR |

FIG. 3

| | SWITCH-TO-MSL COMMAND SET |
|---|---|
| 1 | SET PROPERTY VALUE |
| 2 | GET PROPERTY VALUE |
| 3 | START |
| 4 | PROCESS COMMAND |
| 5 | PROCESS DATA |
| 6 | GET MSL NAME |
| 7 | GET MSL TYPE |
| 8 | GET MSL STATE |

FIG. 4

| MLS TO SWITCH COMMAND SET |
|---|
| DISPATCH START DIRECTNESS TO MSLS |
| DISPATCH COMMAND DIRECTORY TO MSLS |
| DISPATCH DATA PROCESS DIRECTIVE TO MSLS |
| DISPATCH STOP DIRECTIVE TO MSL |

| | |
|---|---|
| 1 | |
| 2 | |
| 3 | |
| 4 | |

| | SWITCH-TO-CONTENT INSPECTOR COMMAND SET |
|---|---|
| 1 | CREATE CONTENT INSPECTOR |
| 2 | SET VALUE OF PROPERTY |
| 3 | GET VALUE OF PROPERTY |
| 4 | PROCESS COMMAND |
| 5 | PROCESS DATA MESSAGE INSPECTION |
| 6 | GET CI NAME |
| 7 | GET CI TYPE |
| 8 | DESTROY CONTENT INSPECTOR |

INTRA-PROCESS MESSAGE SWITCH

This application claims benefit of Provisional application No. 60/182,862 filed Feb. 16, 2000.

FIELD OF THE INVENTION

The present invention relates to intra-process messaging, and more specifically to a message switching framework that enables semi-intelligent switching of messages between heterogeneous message sources.

BACKGROUND OF THE INVENTION

Figure 1:
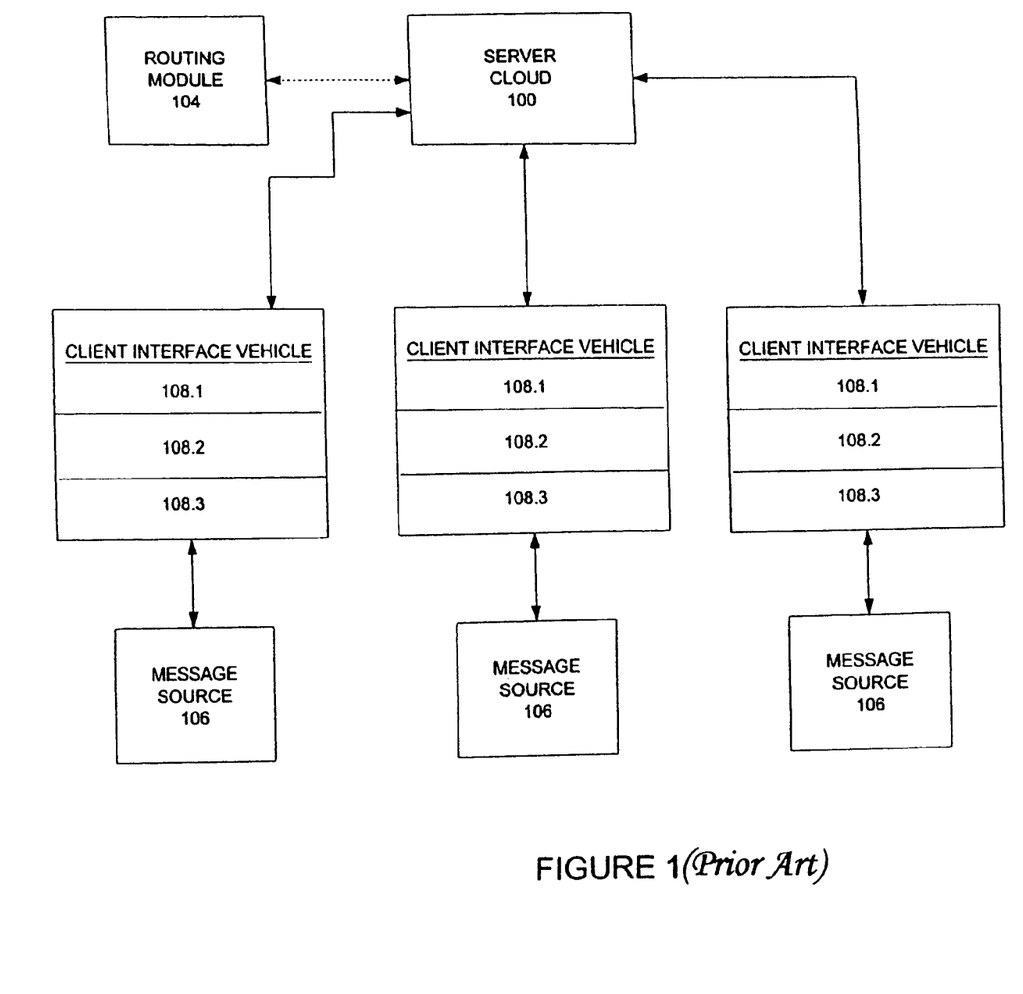
FIG. 1 is a block diagram of a prior art message transfer system.

Applications for enabling message transfer between diverse message sources are becoming common. FIG. 1 is an illustration of a prior art inter-process messaging system such as the SmartSockets 5.5 publish-subscribe messaging infrastructure provided by Talarian Corporation™. SmartSockets enables clients to publish messages to a server cloud that relays the message to all interested client subscribers. The publishing client is responsible for ensuring that a message being published is created and injected into the cloud for delivery in conformance with the formats and protocols specified by the SmartSockets messaging infrastructure. In FIG. 1, the client process 108 is a dual homed 'bridge' client. Client module 108.3 interacts with a message source 106 using source specific protocols of interaction; module 108.2 performs any message translation between the source specific message format and SmartSockets specific message format, and module 108.1 communicates with other client processes through the SmartSockets messaging infrastructure. In communicating with other clients, each message source 106 receives a message from its own message source (through module 108.1) translates the message into the SmartSockets canonical message format (through module 108.2) and injects the message into the SmartSockets delivery system (through module 108.3) for delivery to the interested subscriber clients.

This system, although efficient, still requires each message source 106 to interact with the SmartSockets cloud for communication with other message sources 106 through bridge client processes 108. Currently, each message source 106 must reinvent module 108.1 for each new source type. Since, typically, the implementation of module 108.1 is standard across all message sources 106, this implies a duplication of prior effort for each new message source type.

Moreover, each module 108.1 must subscribe to the server cloud 100 independently for its message source 106. Therefore, when the server cloud 100 needs to deliver a message to message sources 106, it must route a copy of the message to each module 108.1 that subscribed to the message. Thus, the server cloud 100 bears the burden of transmitting a number of copies of each message in order to reach the different message sources 106. This could result in excessive use of the network bandwidth, thereby effectively restricting the scale of the deployment of such an application.

Typically, messaging systems such as SmartSockets perform routing of messages based on control information present in a published message. In the case of SmartSockets, when a client publishes a message, it specifies the destination subject of the message. This subject is present in the control block of the message when received by the server cloud 100. The server cloud 100 determines the interested subscribers by looking up the list of client processes 108 that have registered interest in the subject. The server cloud 100 does not inspect the data block of the message in order to perform routing calculations. In current implementations, if a message must be dispatched from a message source 106 to various heterogeneous message sources based on the content of the message, the message first needs to be routed to a application routing module 104 that determines the ultimate destinations of the message (using some application specific knowledge), and routes the message back through the server cloud 100 to the ultimate recipients of the message. Thus, each publication of a message requires the use of the server cloud 100 for content-based switching, which also increases bandwidth demands on the network. An improvement to the current system would be to enable content-based message routing without requiring a message to be transferred more than once (if at all) to the server cloud 100.

Therefore, an intra-process message switching framework is needed that enables the easy addition of different message source types to a switching environment, provides local content-based switching, and enables lower cost scalability for a network.

SUMMARY OF INVENTION

A system, method, and apparatus are provided to enable semi-intelligent switching-based communication between diverse message source types, the addition of new message source types to the switching framework with minimal start-up costs, and local content-based message switching to minimize traffic on the network. More specifically, a switching environment (henceforth referred to as the 'switch') is provided that abstracts out the commonalities of interfacing with diverse message sources, provides the mechanics of switching messages between such sources, and offers flexibility in the process of deciding the intended recipients of a message based on the content of the message.

The switch interfaces with an in-process source specific interface vehicle called 'Message Source Links (MSL)' through a polymorphic interface designed to abstract out the commonalities of interfacing with message sources. An MSL is responsible for satisfying all messaging requirements native to its own source. However, the polymorphic interface defines a set of universal commands used by all MSLs, and therefore all message sources, in interaction with the server cloud and each other. Furthermore, in one embodiment, a switch interfaces with an in-process content inspector through a polymorphic interface designed to abstract out the commonalities of interfacing with content based routing policy makers. Content inspectors are responsible for inspecting/modifying messages passing through the switch with the purpose of deciding on the list of intended recipient MSLs of the message.

Messages originating from the message source are received by the MSL serving the source, translated to a canonical format specified by the switch, and delivered to the switch through the use of the polymorphic interface. The switch dispatches a message received from an MSL to all other connected MSLs. The recipient MSLs perform translations from the canonical message format to source specific formats and delivers the message to its associated source. Since a single switch can serve a plurality of MSLs, it eliminates the duplicative coding required by current systems. Further, an interface vehicle for a new message source type merely has to provide the information required by the switch, and it can begin communicating through the switch. Thus, the time required to add a new message source type to a switching environment is greatly reduced.

Furthermore, before a switch dispatches a message received from an interface vehicle to all remaining connected vehicles, it consults a content inspector that has the liberty of not only changing the contents of the message but also of altering the list of recipient MSLs. Since content inspectors can modify the list of intended recipients of a message and also inspect/modify the contents of the message, they can be used to perform routing based on the content of the messages. Moreover, given that the content inspectors and source interface vehicles are in-process modules and that a single switch can interface with a plurality of source interface vehicles and content inspectors, a message handed to the switch for dispatch to other message sources can be accomplished without the use of the network. Thus, the present invention also reduces traffic on the network.

Finally, as the switch can serve a plurality of clients, the network becomes more scalable through the addition of switches, instead of requiring the addition of expensive servers to the server cloud.

DETAILED DESCRIPTION OF THE PREFERRED EMBODIMENTS

Figure 2:
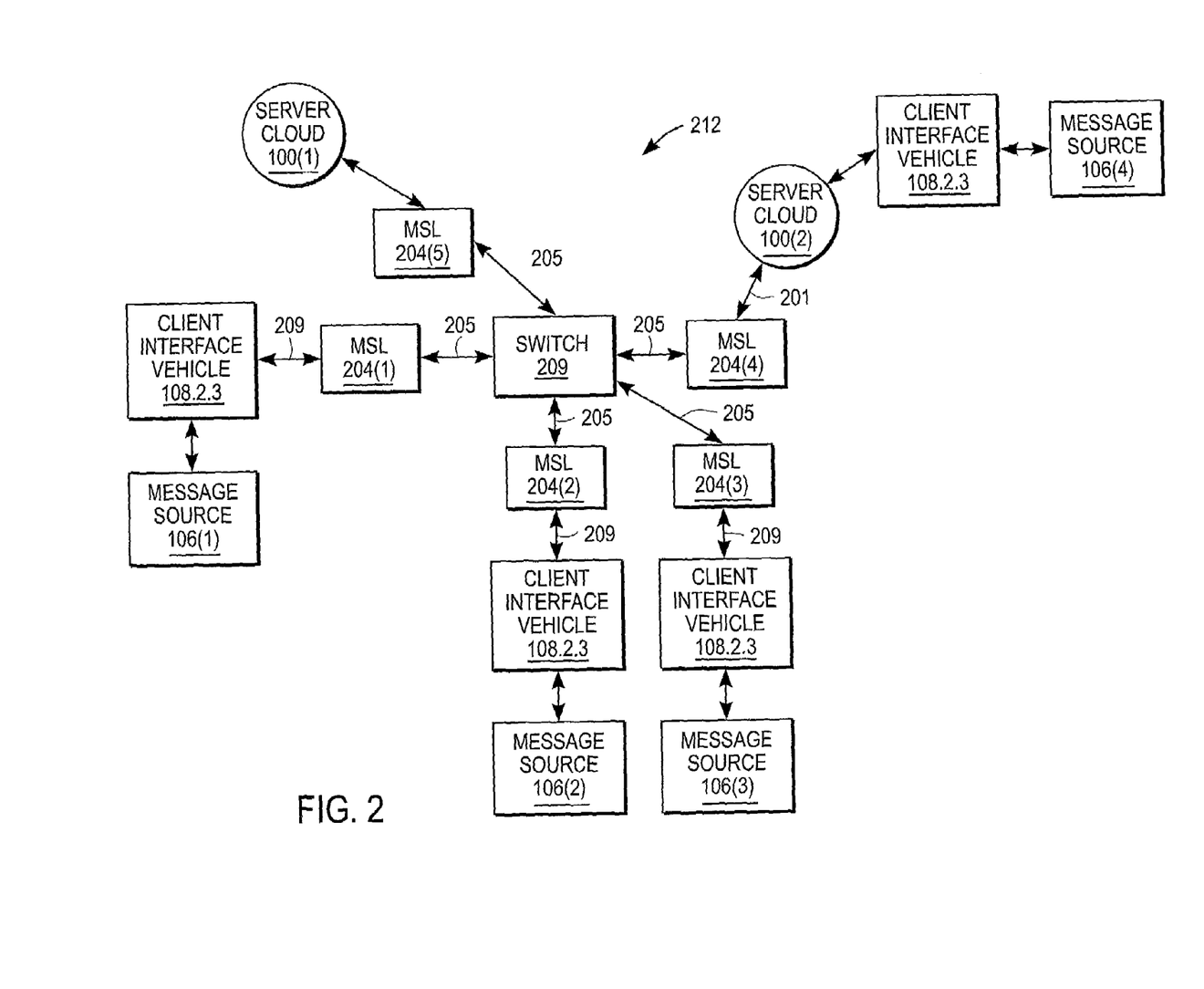
FIG. 2 is a block diagram of a message transfer system in accordance with the present invention.

FIG. 2 is a block diagram of a message transfer system in accordance with the present invention. In one embodiment, server clouds 100 are coupled to a switch 200 of the present invention to exchange messages between message sources 106 coupled to the servers 100, message sources 106 coupled to a switch 200, and message sources 106 coupled to other servers 100. Message sources 106 as used herein are preferably processes, message transfer systems, passive data repositories, database engines, and the like as are known in the art and the messages are communications between the message sources 106. The different message sources 106 may be of differing types, which may create messages in different protocols and may require different processing actions. For example, one message source 106 may be a database that accepts messages from the server cloud 100 and inserts them into the database for auditing purposes, and a second message source 106 may be a client that accepts messages in XML format and injects them into the server cloud 100 in the canonical format expected by the cloud 100.

To accommodate message sources 106 of different types, the present invention uses source interface vehicles referred to as message source links (MSLs) 204 to serve as an interface between switch 200 and clouds 100. The MSL 204, like client modules 108.2/3, is a logical entity that physically is embodied into an in-process object. The MSL 204 in-process object is created when the switch 200 requests an MSL driver to create a new MSL 204. As discussed above, client module 108.3 is responsible for interaction with a message source 106 using source specific protocols of interaction. Client module 108.2 performs any message translation between the source specific format and the format used by the MSL 204. The MSLs 204 interface with the switch 200 using a canonical interface to the switch. In one embodiment, the system of the present invention uses a publish/subscribe model to exchange messages, although other models may be used in accordance with the present invention. In this embodiment, the switch 200 maintains a list of MSLs 204 to which the switch 200 is coupled and the subjects to which the MSLs 204 have subscribed. Then, when the switch 200 receives a message from an MSL 204 to which it is coupled, for example, MSL 204(1), the switch 200 determines which of its MSLs 204 have subscribed to the contents of the message, and routes the message to the appropriate MSLs 204. If a message source 106(4) coupled to a different cloud 100(2) has previously subscribed to the subject of the message, the MSL 204(4) coupled to the cloud 100(2) will subscribe to the subject with the switch 200. The switch 200 will then route the message to the cloud MSL 204(4), which will route the message to the server cloud 100(2), which will in turn route the message to the subscribing message source 106(4). The other servers 100 may or may not also use switches 200 and MSLs 204 in accordance with the present invention. The connections 205 and 209 are in process function call interfaces, and the 201 function interface is implementation specific.

In accordance with the present invention, four different command sets are provided as the interface of the present invention: A switch command set to configure and control a switch 200, a switch-to-MSL command set to enable a switch 200 to issue configuration, control, command and data processing directives to an MSL 204, an MSL-to-switch command set to enable an MSL 204 to issue control, command, and data processing directives to switch 200, and a switch-to-content inspector command set to enable a switch 200 to issue control, command, and data processing directives to a content inspector (discussed below). Although four command sets are described herein, one or any other subset of the four command sets may be used in accordance with the present invention. The command sets are comprised of an idealized instruction set that enable a simple yet rich control, command, and data processing functionality between diverse message sources. Further, the switch-to-MSL and MSL-to-switch command sets enables a switch 200 to function without knowledge of any structure of a particular message source and enables the message source 106 to function by merely obeying the canonical interface of the MSL 204, without knowledge of the message transfer system interface or the structure of the switch 200. Moreover, the use of the interface comprised of one or more of the command sets described below eliminates duplicative coding in creating unique interfaces to a message transfer system 212, as the present invention provides a canonical interface for use by the developer/system administrator. In contrast, in existing messaging systems, the developer must duplicate the effort of creating the interface bridge module 108.1 each time a new message source 106 is created. For example, the bridge module 108.1 in existing systems must contain logic specifying how it should interface with the server cloud 100, which makes the bridge interface a very complex interface. In contrast to the existing bridge module 108.1, the interface of the present invention does not contain logic for interacting with the server cloud 100, as the MSL 204 only concerns itself with interfacing with the client module 108.2 and switch 200, and not the server cloud 100. Thus, the architecture of the present invention only requires a minimal instruction set to enable communication with a message switching entity, whether it be a server cloud 100 or an in-process switch 200. Moreover, as the interface of the present invention is designed to be used for message transfer, the instructions are highly optimized to achieve this functionality. Thus, the interface of the present invention provides the system administrator a simple vehicle for transferring messages in a network.

Figure 3:
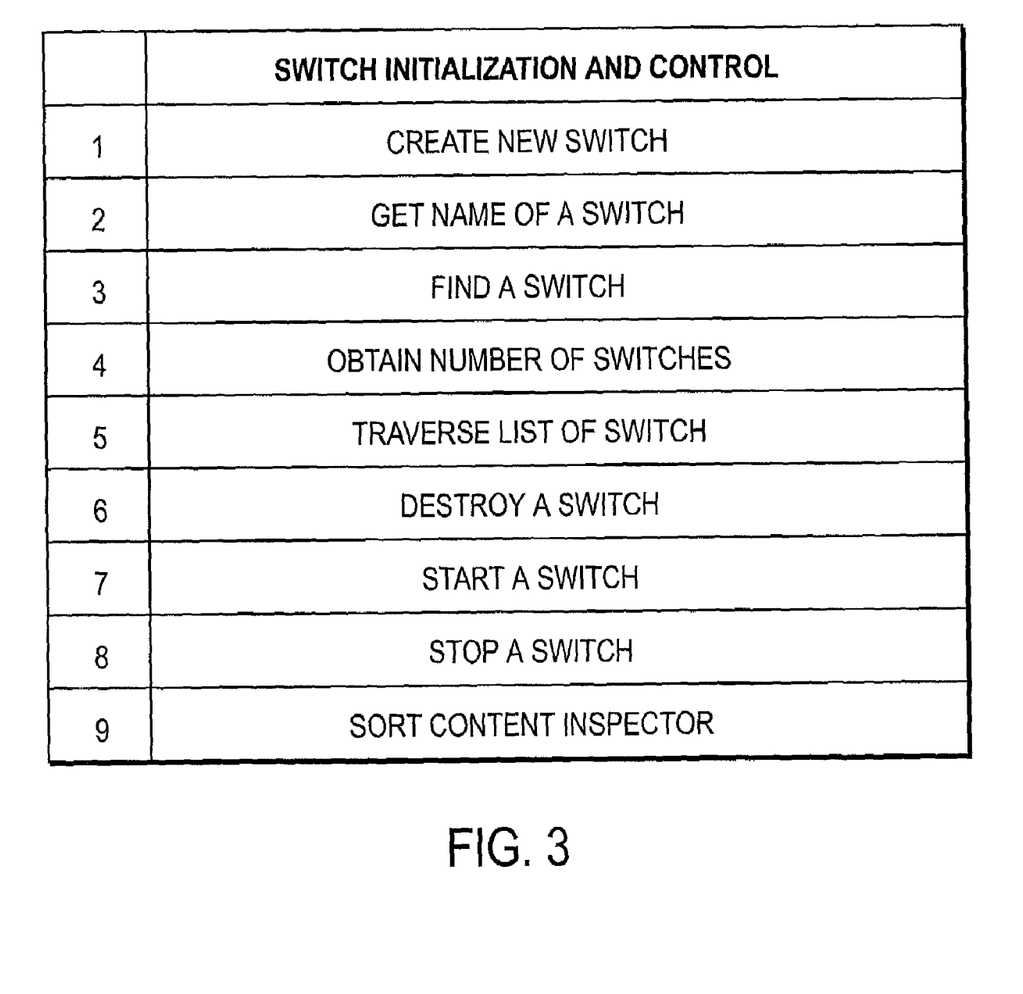
FIG. 3 is a table of directives for initializing and controlling a switch of the present invention.

FIG. 3 is a table of directives for initializing and controlling switches 200 of the present invention. The first directive is Create a New Switch 200. This directive enables a system administrator to create a new switch 200 in a system 212 and then begin attaching MSLs 204 of the present invention. The directive provides a unique identifier to identify the switch 200 within the system 212. A second directive is Get the Name of a Switch 200. This enables a system administrator creating a new MSL 204 to obtain the name of an existing switch 200. A third directive is Find a Switch by Name, which enables a system administrator to locate a specific switch in the system 212. A fourth directive is Obtain the Number of Switches 200 which enables a system administrator to verify the system administrator's understanding of the number of switches 200 present in the system 212. A fifth directive is Traverse The List of Switches 200 to return a list of switches present in a system 212. A sixth directive is Destroy a Switch 200, which enables a system administrator to destroy a previously created switch 200 and any associated MSLs 204 and content inspectors, in an embodiment in which content inspectors are used. A seventh directive is Start a Switch 200, which causes the switch 200 to check the state of the MSL 204 in the switch 200 and starts any currently stopped MSLs 204. As the system 212 does not maintain the state of a switch 200, the switch 200 can be started repeatedly. This enables a system administrator to start newly created MSLs 204 that have been added to an executing switch 200. An eighth directive is Stop a Switch, which causes the switch 200 to check the state of each MSL 204 in the switch and stop any currently executing MSLs 204. A ninth directive is Sort Content Inspector. This directive sorts content inspectors 804 in a switch 200, as discussed below. The above instruction set allows a system administrator to quickly and efficiently create and control a plurality of switches 200.

Figure 4:
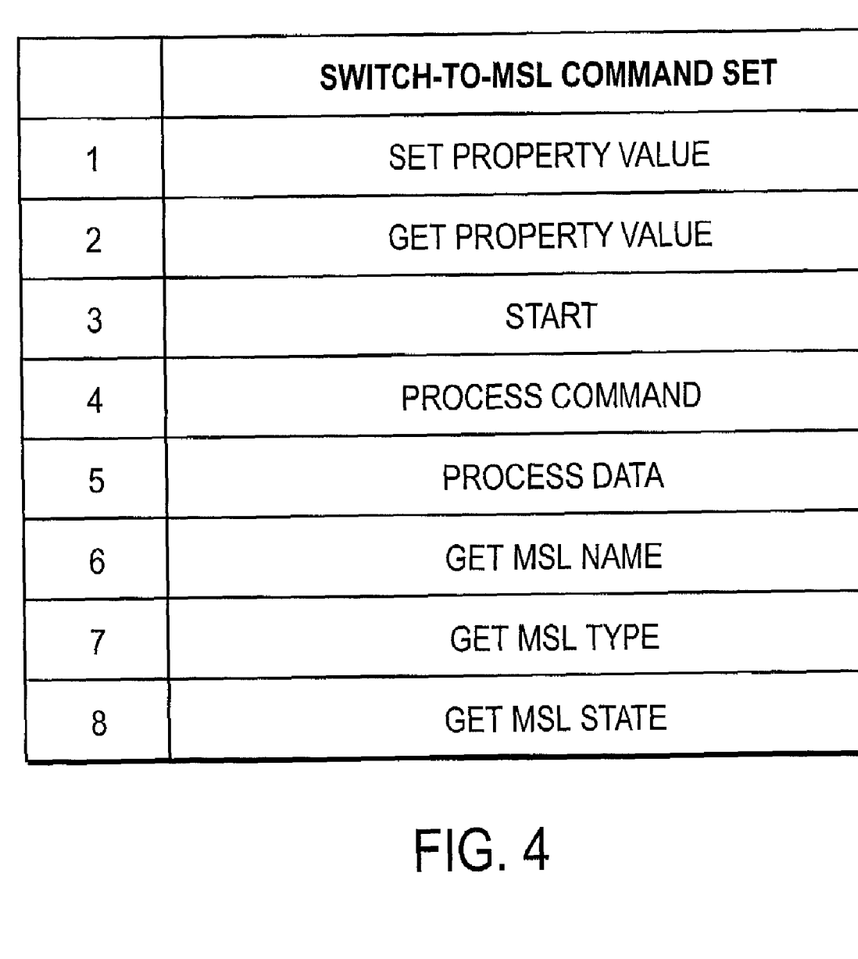
FIG. 4 is a table of Switch-MSL directives for a switch of the present invention.

The switch-to-MSL command set is illustrated in FIG. 4. The command set comprises universal message source type independent directives for a switch 200 of the present invention. The switch 200 communicates with an MSL 204 through the use of this command set. The MSL 204 adapts the general requests from the switch 200 to requests specific to the type of message source with which the MSL 204 is interacting. Thus, the MSL 204 and the command set of the switch 200 enables clients of varying types to communicate with each other easily and with a minimum of client intervention.

The first directives listed are Set Property Value and Get Property Value. Set Property Value is a directive used by a system administrator to set a property used by the message source 106. The set property value directive is enabled by the MSL 204 to allow the client to set the property value, and the property value is an operand specified by the system administrator. For example, for an MSL coupled to a cloud 100, the set property value may specify a list of subjects to which the MSL 204 should subscribe. Alternatively, the property value may specify the server names and addresses to which an MSL 204 should connect. The Get Property Value allows the administrator to retrieve a specified property value, for example, a list of subjects to which an MSL 204 has subscribed. The Set Property Value command is issued only prior to an MSL 204 being started.

The Start MSL directive starts an MSL 204. The MSL 204 is an in-process object that is instantiated from an MSL driver associated with the source type of a particular message source 106. In a preferred embodiment, there are different MSL drivers to create MSLs 204 of various types. The MSL drivers are dynamically loadable libraries that are created by designers of message source interfaces (people who understand the nature of communication with a specific message source type). The directive to create a new MSL interface vehicle 204 and bind it to a switch 200 is issued by a system administrator. In accordance with the present invention, the act of adding a new source type to a switch 200 is the task of the administrator, and does not require involvement of the developer. The Create MSL directive creates a new MSL 204 of a specified type in a specified switch 200. The switch 200 binds to the associated MSL driver of the specified type upon receipt of this command and then manufactures a new MSL object of that type. The newly created MSL 204 is typically created in a stop state and is started using the start MSL command 204.

After being started, the MSL 204 is controlled by a system administrator of the message source 106 using the command set. The next directive listed in FIG. 4 is the Process Command directive. This directive requires the MSL 204 to execute the command that is placed in the Command operand position. For example, if an MSL 204 is connected to a cloud 100, the MSL 204 can be ordered to disconnect with a Process Disconnect directive. Alternatively, a message source 106 may want to subscribe to a new subject, and the administrator will issue a Process Subscribe command and the subject name to the MSL 204. The MSL 204 will receive the subscription request and forward the request through the switch 200 to the MSLs 204 connected to the clouds 100. The commands supported by the MSL 204 are specific to the MSL and are specified as part of the operational characteristics of the MSL needed by an administrator of a switch.

The Process Data directive causes an MSL 204 to process data. For example, when a switch 200 forwards data to an MSL 204, the switch 200 will issue a Process Data directive. The MSL 204 will process the data, for example, by translating it into a protocol recognizable by a message source 106 to which the MSL 204 is coupled. For example, an MSL 204 coupled to a database client will store the data into the database in accordance with the format of the database. Alternatively, an MSL 204 coupled to a cloud 100 will publish the data to the cloud 100, in a format compatible with the protocol used by the cloud 100. The exact functionality to be performed by the MSL 204 is specified by the administrator implementing the MSL 204.

The Stop MSL directive stops an MSL 204 that is currently executing. The Get MSL Type and Get MSL Name directives are used to get the name and type of an MSL. The Get MSL State directive allows the switch to monitor the state of an MSL 204 and issue state specific commands. Thus, the above command set can be used by an administrator to create communication between a switch 200 of the present invention and a message source interface vehicle such as the MSL 204 of the present invention, to enable easy communication between message sources 106 of any type.

Figure 5:
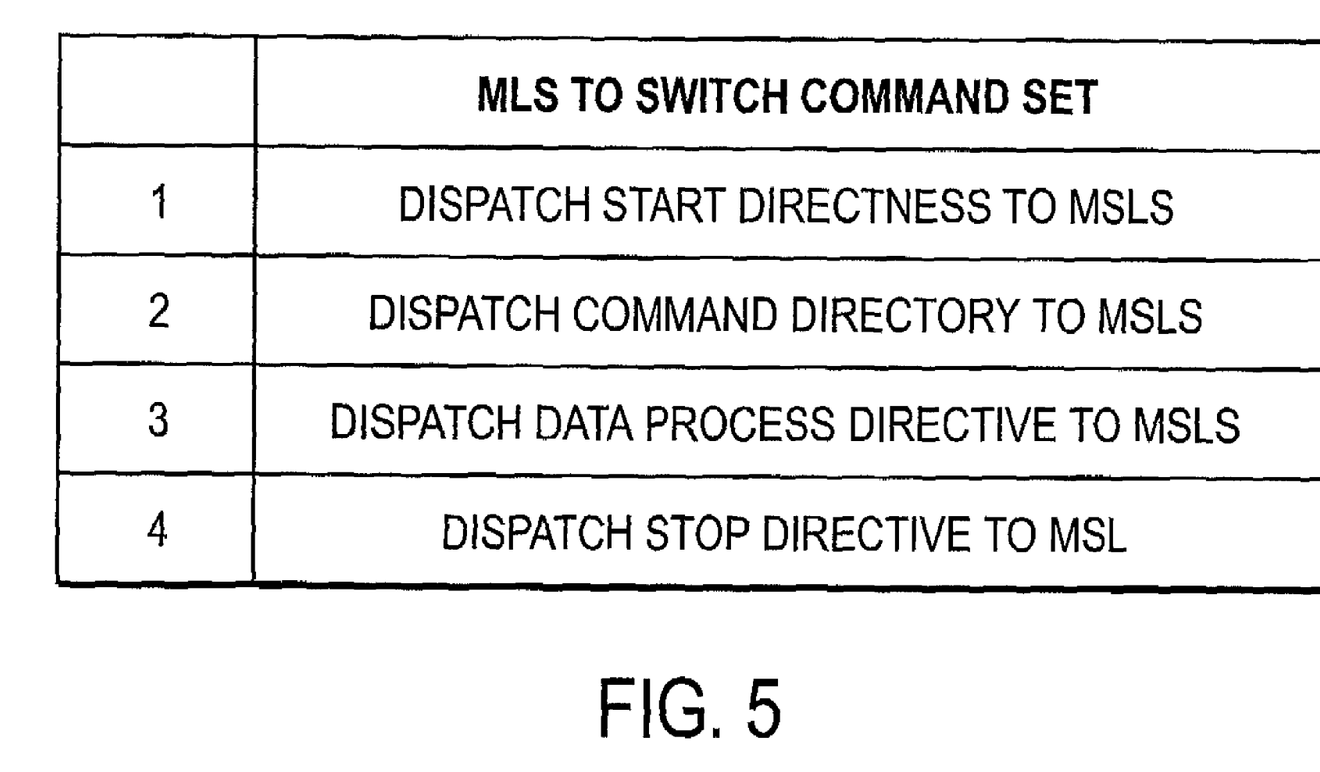
FIG. 5 is a table of MSL-Switch directives for an MSL of the present invention.

FIG. 5 is a table of directives for an MSL of the present invention for issuing directives to a switch 200. The first directive is a Dispatch Start directive to MSLs 204. This directive directs the switch 200 to begin the execution of other identified MSLs 204 coupled to the switch 200. This allows an MSL 204 to act as a master MSL 204 and ensures that a particular MSL 204 is executing prior to delivering a message to that MSL 204. A second directive is a Dispatch Data Message processing directive to MSLs 204. This directive instructs the switch 200 to send a data message to identified MSLs 204 for processing by those MSLs 204 to, for example, have the MSL 204 transfer data to a message source 106 after performing necessary translation. A third directive is Dispatch Command Processing directive to MSLs. This enables an MSL 204 to have the switch 200 direct command processing directives to MSLs 204 to have those MSLs 204 process commands issued by the first MSL 204. Finally, a Dispatch Stop directive MSL command is provided to enable an MSL 204 to stop the execution of an identified MSL 204. All of the above commands combine to enable a single MSL 204 to control the behavior of and communicate with other MSLs 204 coupled to the switch 200 using a minimal instruction set. Thus, the above four command sets, alone or combined, provide a minimal optimized instruction set interface that enables a system administrator to add new message source types to a network easily, and without creating redundant and overly complex code to enable the integration of the new message source 106.

Figure 6:
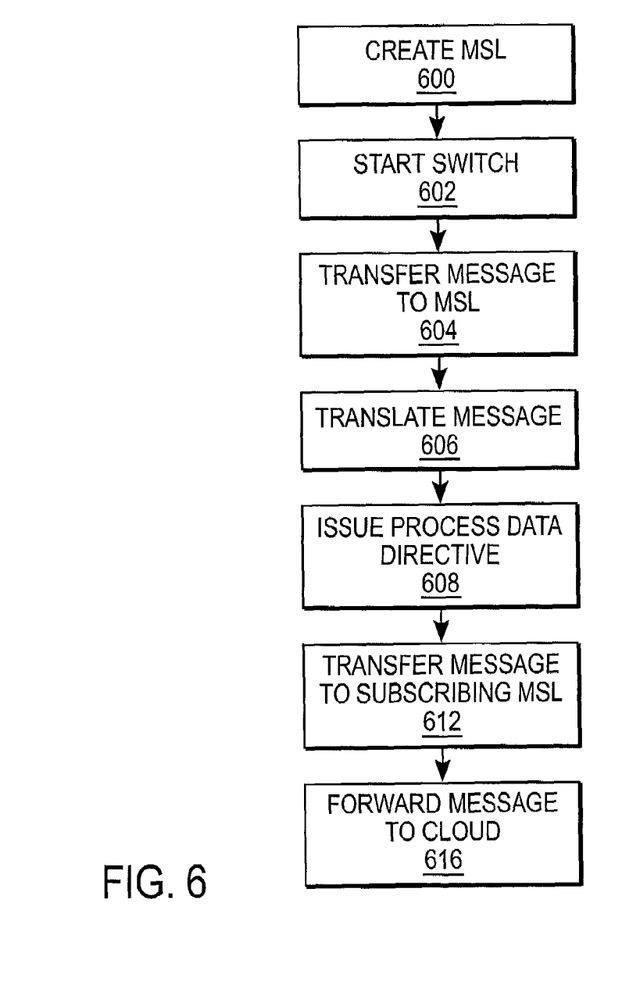
FIG. 6 is a flowchart of publishing a message to a server cloud in accordance with the present invention.

FIG. 6 is a flowchart illustrating a method of publishing a message in accordance with the present invention for the first time for a new message source 106. First, a system administrator for the message source 106 issues a Create MSL command to a switch 200. The system administrator specifies a message source type that will correspond to a MSL driver the system administrator previously deployed. The switch 200 binds itself to the corresponding MSL driver, and creates 600 an MSL 204. As discussed above, the message source 106 can be of any type, as it will be using the MSL 204 to communicate with the switch 200 through the interface of the present invention, thus eliminating the need for the switch 200 to be aware of the structure of the message source 106 and eliminating the need for the system administrator to be aware of the structure of the switch 200. Before any message transfer can occur, the administrator starts 602 the newly created switch 200 to start all newly created MSLs 204 bound to the switch. This is accomplished by issuing the Start directive to the switch 200. Once MSL 204 is executing (i.e. has been started), the message source 106 transfers 604 the message to be transmitted to the MSL 204. The message will be in a message-source specific format, and the MSL 204 translates 606 the message into a canonical format such as SmartSockets™ from Talarian Corporation, although any other canonical format may be used in accordance with the present invention. MSL 204 then issues 608 a Process Data directive to instruct the switch 200 to transfer the message to the identified MSLs 204. The switch 200, upon receiving the directive, will respond to the directive and transfer 612 the message to any MSL 204 that is identified, or, in a publish-subscribe model, to any MSL 204 that has subscribed to the subject. If a message source 106 that is connected to the switch 200 through a cloud 100 has subscribed, the MSL 204 that is coupled to the cloud 100 will receive the message and forward 616 it to the cloud.

For example, in FIG. 2, in a publish-subscribe model, if message source 106(4) has subscribed to a subject of a message that message source 106(1) has published, MSL 204(4) will have notified the switch 200 that it should receive all messages with that subject. Once switch 200 receives the message, it will forward the message to MSL 204(4), which in turn will forward the message to the server cloud 100(2), which will forward the message to message source 106. If message source 106(4) also uses an MSL 204, the MSL 204 will translate the canonical message forwarded by the server cloud 100(2) into the data type of the message source 106(4) using the interface of the present invention. Thus, message source 106(1) can publish a message of any data type and have it transferred through the network to a message source 106(4) of differing data type using the interface of the present invention to eliminate the need to create redundant interface code. The message sources 106 do not need to create redundant interface code, as the only interface code needed is that which conforms to the MSL-switch and switch-MSL command sets. Finally, the message sources 106 are not burdened with the requirement of optimizing the interface to interact with the network as this is directly accomplished by using the interface of the present invention.

Additionally, by selecting the message sources 106 coupled to the same switch 200 to include those message sources 106 that communicate frequently, the present invention can substantially reduce the traffic on the network at large. For example, if a system administrator is aware the message sources 106(1)–(3) communicate frequently, the system administrator can create a switch 200 coupled to the MSLs 204 associated with those message sources 106. In this architecture, all of the traffic between those message sources 106 will be routed by the switch 200 and will not input the server cloud 100. Thus, the present invention can minimize traffic on a server cloud 100.

Figure 7:
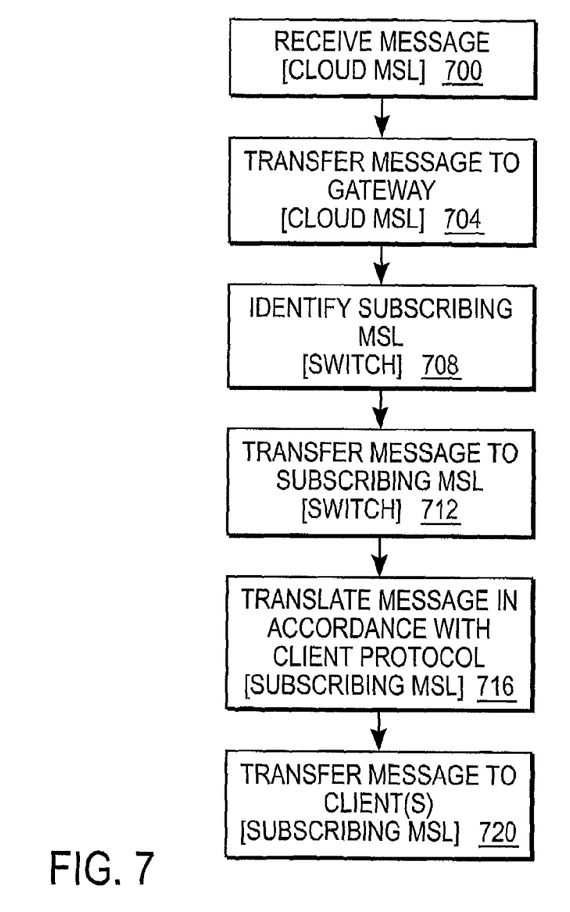
FIG. 7 is a flowchart of receiving a message from a server cloud in accordance with the present invention.

FIG. 7 is a block diagram illustrating receiving a message in accordance with the present invention. First, a cloud MSL 204 (204(4) and 204(5) in FIG. 2) receives 700 a message from a server cloud 100. The cloud MSL 204 has received the message because it has previously subscribed to the subject of the message with the transmitting cloud 100. Next, the cloud MSL 204 transfers 704 the message to the switch 200. In an embodiment in which the switch 200 canonical format is different from the canonical format used by the message transfer system 100, the cloud MSL 204 translates a received message from one format to the other. In a publish-subscribe model, the switch 200 then identifies 708 the MSLs 204 that have subscribed to the subject of the message. The switch 200 transfers 712 the message to the subscribing MSLs 204 by issuing a Process Data directive that instructs the MSLs 204 to translate the message from the canonical format to the messaging source specific format. The subscribing MSLs 204, who each may be coupled to a message source 106 of differing type, translates 716 the message and transfers 720 the message to the message source 106 to which it is coupled.

Figure 8:
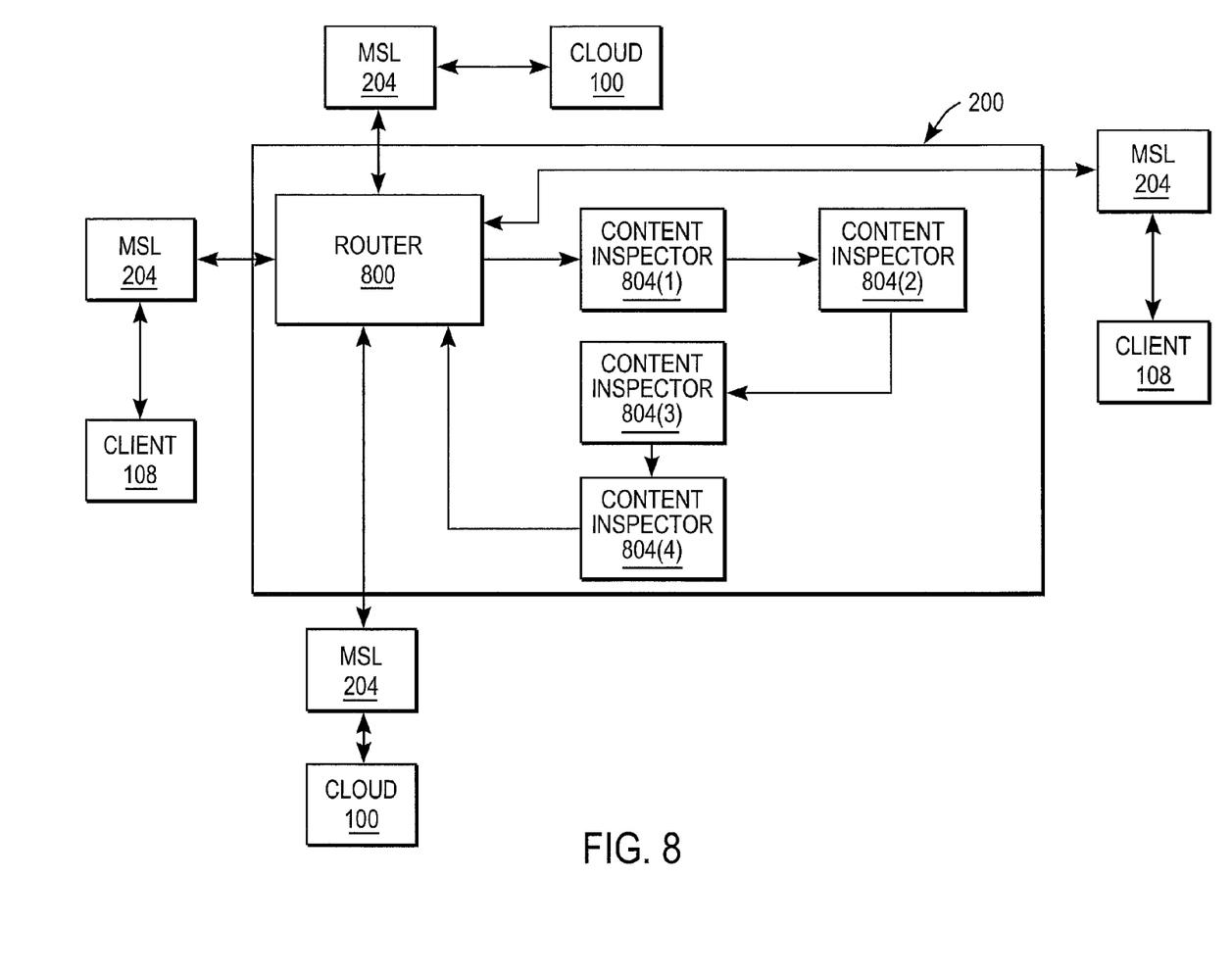
FIG. 8 is a block diagram of a switch with content inspectors in accordance with the present invention.

In one embodiment, the switch 200 also provides content inspection of the messages that it routes. FIG. 8 is a block diagram of a switch 200 that also provides content inspection. The switch 200 has a router 800 that transmits messages to identified destinations, as conventional routers operate. For incoming messages to the switch 200, the router 800 is programmed to switch the message to a series of content inspector modules 804. A content inspector module 804 is an in-process object, implemented in software, that filters messages based on characteristics of the message.

Preferably, a series of content inspectors 804 are used, each designed to filter a message based on a different characteristic, as specified by an administrator. For example, a content inspector 804 may filter out messages of a certain type from being transmitted from one cloud 100(1) to another the server cloud 100(2), even if a cloud MSL 204 has subscribed to the message. The filtering may be applied for security purposes, content based routing considerations, to reduce traffic on a network, and the like. Further, a content inspector 804 may also modify the data in a message. For example, a content inspector 804 may be designed to convert a message in a first version of a protocol into a format compliant with a second version of a protocol. Thus, the switch 200 through the use of content inspectors 204, is capable of routing and modifying data as determined by the administrators.

The content inspectors 804 are canonical in form and obey a series of commands used by the switch 200. In a preferred embodiment, each type of content inspector 804 is associated with a content inspector driver that is responsible for creating links to perform content inspection of the type associated with the driver. The driver is preferably an independent module with the capability of being dynamically loaded and bound to by the switch 200. When the switch 200 needs to create a content inspector of a particular type, the switch 200 loads and binds to the driver of that type and requests the driver to create a content inspector 804 for use by the switch 200. The driver then creates a new content inspector object, and returns to the switch 200 the interface for the newly created object. The switch 200 only interacts with the content inspector 804 through the interface, and therefore the switch 200 does not need to be aware of the structure of the content inspector 804. This, in turn, enables the administrator to create content inspectors 804 of any structure, because the switch 200 does not need to interact with that structure.

Figure 9:
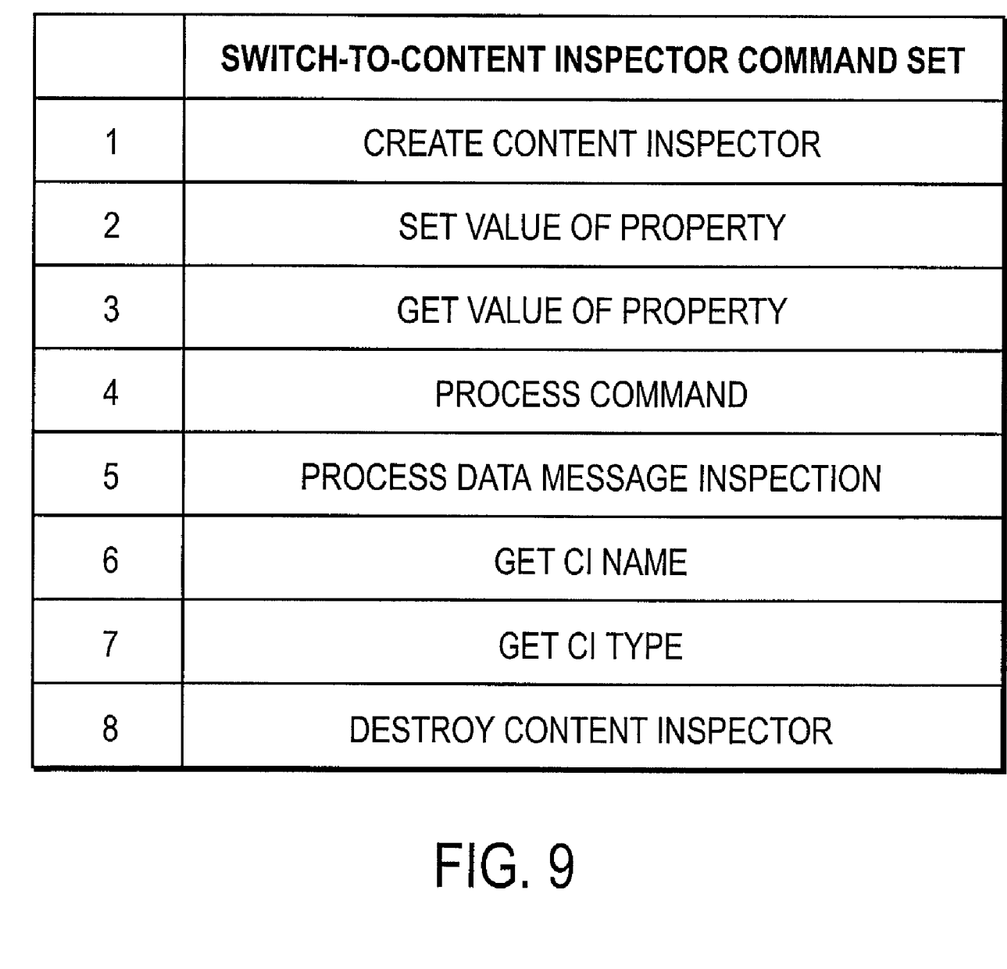
FIG. 9 is a table of directives for a switch of the present invention in an embodiment in which content inspectors are controlled by the switch.

FIG. 9 is a table of directives for a switch 200 of the present invention in an embodiment in which content inspectors are controlled by the switch 200. A first directive is Create Content Inspector. This directive creates a new content inspector 804 of a specific type associated with a specific switch 200. The directive binds the switch 200 to a content inspector driver of the specified type. Once bound, the switch 200 will create a new content inspector of that type using the driver and add the new content inspector 804 to the identified switch 200.

A second directive is Set Property Value. This directive is issued by the switch 200 to set the value of a property in a specified content inspector 804. The switch 200 does not need to understand the property value itself, but merely sets the property values specified. Although the switch 200 does not understand the property value, the administrator issuing the command to the switch 200 through the switch command set to set a property value in a content inspector 804 does understand the meaning of the property value being set. The system administrator understands the set of properties supported by a content inspector 804 prior to deploying the content inspector 804 from the specification of the operational characteristics of the content inspector 804. The values are the set according to the functionality of the property, and are determined by the system administrator. Thus, in accordance with the present invention, the switch 200 does not need information regarding content inspector structure, allowing structures of different types to be used without modifying the switch 200, and still allowing flexibility to the system administrator in designing a content inspection algorithm to meet the needs of the system administrator.

A third directive is Get Property Value, which enables a system administrator to check the current operation value of a property of the content inspector 804. A fourth directive is Process Command, which causes a specified content inspector 804 to execute a command, allowing the switch to control the operation of the content inspectors. For example, a system administrator may need to add a new message type to the list of message types being filtered by a content inspector while the switch 200 is executing. This is, typically, accomplished through the Process Command directive to avoid any interruption in the message flow through the switch 200 while this directive is being executed. A fifth directive is Process Data Message inspection, which directs a content inspector to process a data message in accordance with its programming to perform semi-intelligent policy decision making on the data message, as described above. Sixth and seventh directives include Get a Content Inspector Name and Type, which allows the system administrator to obtain information about existing content inspectors 804 in a switch. An eighth directive is Destroy Content Inspector, which allows the system administrator to have the switch 200 destroy an existing content inspector 804.

Figure 10:
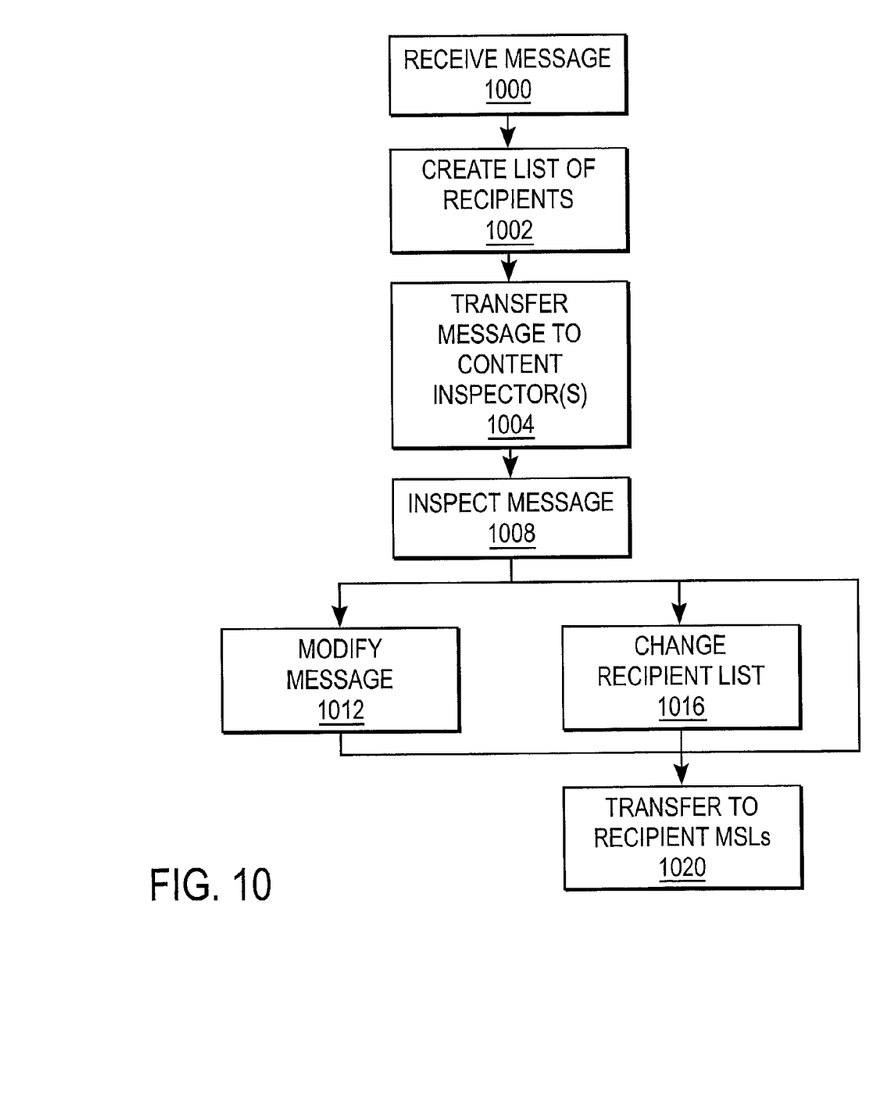
FIG. 10 is a flowchart of a switch with content inspectors processing a message in accordance with the present invention.

As shown in FIG. 10, in this embodiment, when a switch 200 receives 1000 a message for which it will dispatch a process data message to an MSL 204, the switch 200 creates 1002 a list of recipient MSLs 204 for the message based on its subscription lists. Then, the switch 200 transfers 1004 the message to the list of content inspector objects. The switch 200 maintains the content inspectors 804 as an ordered list. In one embodiment, the order is dynamically reconfigurable. In this embodiment, the content inspectors 804 each have a position property field with a numerical value. Then, the switch 200 orders the content inspectors 804 based on their numerical values in response to receiving a sort command or creating a new content inspector 804. To change the order of the content inspectors 804, the administrator can modify the position property field, and then issue the sort command to the switch 200 to have it reorder the content inspectors 804 to allow the content inspectors 804 to process messages in accordance with the new order. The sorting feature provides flexibility in allowing a system administrator may prioritize the importance of some inspection algorithms over others. The content inspectors 804, upon receipt of the message and a Process Data Message directive, inspects 1008 the message. Then, if the message is one of which the content inspector 804 is designed to perform some action, the content inspector 804 may modify 1012 the data, change 1016 the list of recipient MSLs, or both. Then, the message is relayed through the entire content inspector object list until all of the content inspectors 804 have inspected the message. The switch 200 then transfers 1020 the message to the resulting set of recipient MSLs 200 using the appropriate command. Thus, the use of content inspectors 804 provides content based routing at a switch 200 level, thus eliminating the need for messages to be transmitted to an independent router through a cloud 100, thus eliminating unnecessary traffic on the network.

The invention claimed is:

1. A system for enabling message transfer comprising:
an intra-process messaging switch, coupled to a message transfer system, for communicating with the message transfer system in accordance with a protocol of the message transfer system and coupled to at least two message source links to enable the exchange of data between a message source and the message transfer system responsive to issuance of message source independent commands;

a command set of message source independent commands to be issued from the intra-process messaging switch that enables the intra-process messaging switch to issue configuration, control, command, and data processing directives to the at least two message source links, such command set usable by a system administrator of a message source to enable a switch to transfer data to a message source link without requiring the switch to be aware of any message source specific functionality; and the at least two message source links coupled to message sources of different types and the intra-process messaging switch, wherein each message source link translates messages into formats compatible with the message source type of the message source to which the message source link is coupled in response to receiving message source independent commands.

2. The system of claim 1, wherein the at least two message source links issue message source independent commands to the intra-process messaging switch to transfer messages from message sources to other message sources in the system.

3. The system of claim 1 wherein the command set of message source independent commands to be issued from an intra-process messaging switch to a message source link is comprised of start message source link, stop message source link, process data, process command, get property value of a message source link, and set property value of a message source link.

4. The system of claim 2 wherein a command set of message source independent commands to be issued from a message source link to an intra-process messaging switch provides the intra-process messaging switch the ability to start execution of a message source link, stop execution of a message source link, have a message source process data, and have a message source process a command, and a system administrator of a sending message source is able to use the command set to enable a message source link to transfer data to other message sources without requiring the sending message source to be aware of any message source specific functionality.

5. The system of claim 1 in which the intra-process messaging switch provides routing functionality, the intra-process messaging switch further comprising:

a plurality of content inspector modules, each content inspector module designed to process a message for at least one routing decision.

6. The system of claim 5 wherein the intra-process messaging switch controls content inspector modules using a content inspector independent command set to enable the intra-process messaging switch to route messages without being aware of content inspector specific functionality.

7. A system for transferring messages in a network comprising:

a plurality of message sources;

a plurality of message source links, each coupled to a message source;

an intra-process messaging switch, coupled to a subset of the plurality of message sources via the message source links; and a message transfer system, coupled to the intra-process messaging switch, wherein the message transfer system transfers messages based on subscription lists maintained by the intra-process messaging switch, such subscription lists indicating which message sources have subscribed to a subject of a message, thereby enabling the message transfer system to transfer a single copy of a message to a subscribing message source regardless of whether multiple message sources coupled to the intra-process messaging switch have subscribed to the subject of the message.

8. The system of claim 7 wherein the intra-process messaging switch further comprises a plurality of content inspector modules, for inspecting and routing messages to message source links based on characteristics of the messages other than a message address.

9. The system of claim 8 wherein each content inspector module is to recognize a protocol of a message and transform the message into a second protocol prior to transmission to a message source.

10. The system of claim 8 wherein each content inspector module is to inspect a list of intended recipients of the message and modify the list of intended recipients based on pre-defined criteria.

* * * * *